(12) United States Patent
Bharshankar et al.

(10) Patent No.: US 9,253,270 B2
(45) Date of Patent: Feb. 2, 2016

(54) METHOD AND SYSTEM TO SHARE, SYNCHRONIZE CONTENTS IN CROSS PLATFORM ENVIRONMENTS

(71) Applicant: Samsung Electronics Co. Ltd., Suwon-si, Gyeonggi-do (KR)

(72) Inventors: Neha Vijay Bharshankar, Bangalore (IN); Gaurav Kumar Jain, Bangalore (IN); Samrat Subnash Nawle, Bangalore (IN); Anisha Vengalatore Thattai, Bangalore (IN); Girish Kulkarni, Bangalore (IN); Jayakarthick Sathyanarayanan, Bangalore (IN); Sheriyar Saiffuddin, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 286 days.

(21) Appl. No.: 13/860,849

(22) Filed: Apr. 11, 2013

(65) Prior Publication Data
US 2013/0275883 A1    Oct. 17, 2013

(30) Foreign Application Priority Data
Apr. 11, 2012    (IN) .......................... 1456/CHE/2012

(51) Int. Cl.
*G06F 15/00* (2006.01)
*G06F 13/00* (2006.01)
*H04L 29/08* (2006.01)

(52) U.S. Cl.
CPC ............ *H04L 67/22* (2013.01); *H04L 67/1095* (2013.01)

(58) Field of Classification Search
CPC ............................. G06F 15/16; H04L 67/22
USPC ................. 715/763–765, 851–855, 754, 723
See application file for complete search history.

(56) References Cited

U.S. PATENT DOCUMENTS

| 8,832,190 B1* | 9/2014 | Leske et al. ................... 709/204 |
| 2011/0252320 A1* | 10/2011 | Arrasvuori et al. ........... 715/704 |
| 2011/0282942 A1* | 11/2011 | Berger et al. ................. 709/204 |

* cited by examiner

*Primary Examiner* — Kevin Nguyen
(74) *Attorney, Agent, or Firm* — Jefferson IP Law, LLP

(57) ABSTRACT

A method and system to manage items associated with different entities is provided. The items can be content and contacts. The entities can be Social Networking Sites (SNS), device, and contact groups in the device, contact groups in the SNS, content hosting servers or the like. The method provides a grid structure to display items associated with different entities. Further, the method allows a user to share items by performing one or more actions. The actions can be a voice, a gesture or a gaze. The gesture can be an emotion, a tap, a scroll, a drag, a drop, a pinch, a swipe and a hover. The method facilitates re-location and re-grouping of the items. The method allows the user to create and edit an album and a relational view with the items associated with different entities.

20 Claims, 15 Drawing Sheets

| Name | SNS 1 | SNS 2 | SNS 3 | Device (Contacts) | City (CT) | College | Organization | eMail | DOB | CG |
|---|---|---|---|---|---|---|---|---|---|---|
| A | Yes | No | Yes | No | CT1 | UNI1 | ORG1 | a@xyz.com | 12/07/1985 | CG1 |
| B | Yes | Yes | No | Yes | CT2 | UNI2 | ORG2 | b@xyz.com | 13/01/1992 | CG2 |
| C | No | No | No | Yes | CT3 | UNI1 | ORG3 | c@xyz.com | 30-03-1980 | CG2 |
| D | No | No | Yes | No | CT1 | UNI1 | ORG2 | d@xyz.com | 21-04-1975 | CG2 |
| E | Yes | No | Yes | Yes | CT2 | UNI2 | ORG2 | e@xyz.com | 13-02-1980 | CG2 |
| F | No | Yes | Yes | Yes | CT1 | UNI3 | ORG4 | f@xyz.com | 23-03-1989 | CG1 |

SNS-Social Networking Sites
CG-Custom Groups

FIG.3

METHOD AND SYSTEM TO SHARE, SYNCHRONIZE CONTENTS IN CROSS PLATFORM ENVIRONMENTS

PRIORITY

This application claims the benefit under 35 U.S.C. §119 (a) of an Indian patent application filed on Apr. 11, 2012 in the Indian Patent Office and assigned Serial No. 1456/CHE/2012, the entire disclosure of which is hereby incorporated by reference.

BACKGROUND OF THE INVENTION

1. Field of the Invention

The present invention relates to managing content and contacts associated with multiple platforms. More particularly, the present invention relates to sharing content and contacts in cross platform environments.

2. Description of the Related Art

As the popularity of social networking is increasing, people are becoming connected by sharing content with their contacts. This vast array of content is becoming unmanageable and time consuming for posting the content on social network sites and on platforms that allow content sharing. The platforms may be Social Networking Sites (SNS), discussion forums, chat session, content hosting servers, devices, and the like. The content may be multimedia content such as audio, video, images, text content such as comments, messages, files, link to content (e.g., hyperlinks) such as Uniform Resource Locator (URL), hypertext, communication content such as Short Message Service (SMS), Multimedia Messaging Service (MMS), calls, emails, and the like.

Despite the fact that content sharing represents one of the prominent features of existing social network sites, there are no effective mechanisms for cross sharing content between different platforms. In addition, according to the related art, sharing the same content across multiple platforms is difficult. For example, according to the related art, a user has to manually share the content with contacts in individual platforms. The manual sharing of content with contacts in individual platforms according to the related art is not very effective and time consuming.

Due to abovementioned reasons, there is need for an effective mechanism to share content and contacts between different entities. The entities may be SNS, relational views, content hosting servers, devices, and the like. The relational views may be contact groups in SNS, contact groups in the device, and may be formed from contacts in the device and SNS or formed based on the common information between contacts associated with the entities.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method to manage and share content and contacts (items) across different entities.

Another aspect of the invention is to provide a method to display the content and contacts associated with different entities.

Another aspect of the invention is to provide a method to share the content and contacts between different entities by performing one or more actions.

In accordance with an aspect of the present invention, a method for managing at least one item associated with a plurality of entities is provided. The method includes displaying the at least one item associated with the plurality of entities. Further the method comprises performing at least one action to share at least one item with at least one of the plurality of entities.

In accordance with another aspect of the present invention, a system for managing at least one item associated with a plurality of entities is provided. The system includes a device. The system is configured to display the at least one item associated with a plurality of entities, and to perform at least one action to share at least one item with at least one of the plurality of entities.

In accordance with another aspect of the present invention, an electronic device for managing at least one item associated with a plurality of entities is provided. The electronic device includes an integrated circuit, comprising at least one processor, and at least one memory. The memory comprises a computer program code stored thereon. When the computer program code is executed, the at least one processor causes the electronic device to display the at least one item associated with the plurality of entities, and to perform at least one action to share at least one item with at least one of the plurality of entities.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a database information according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
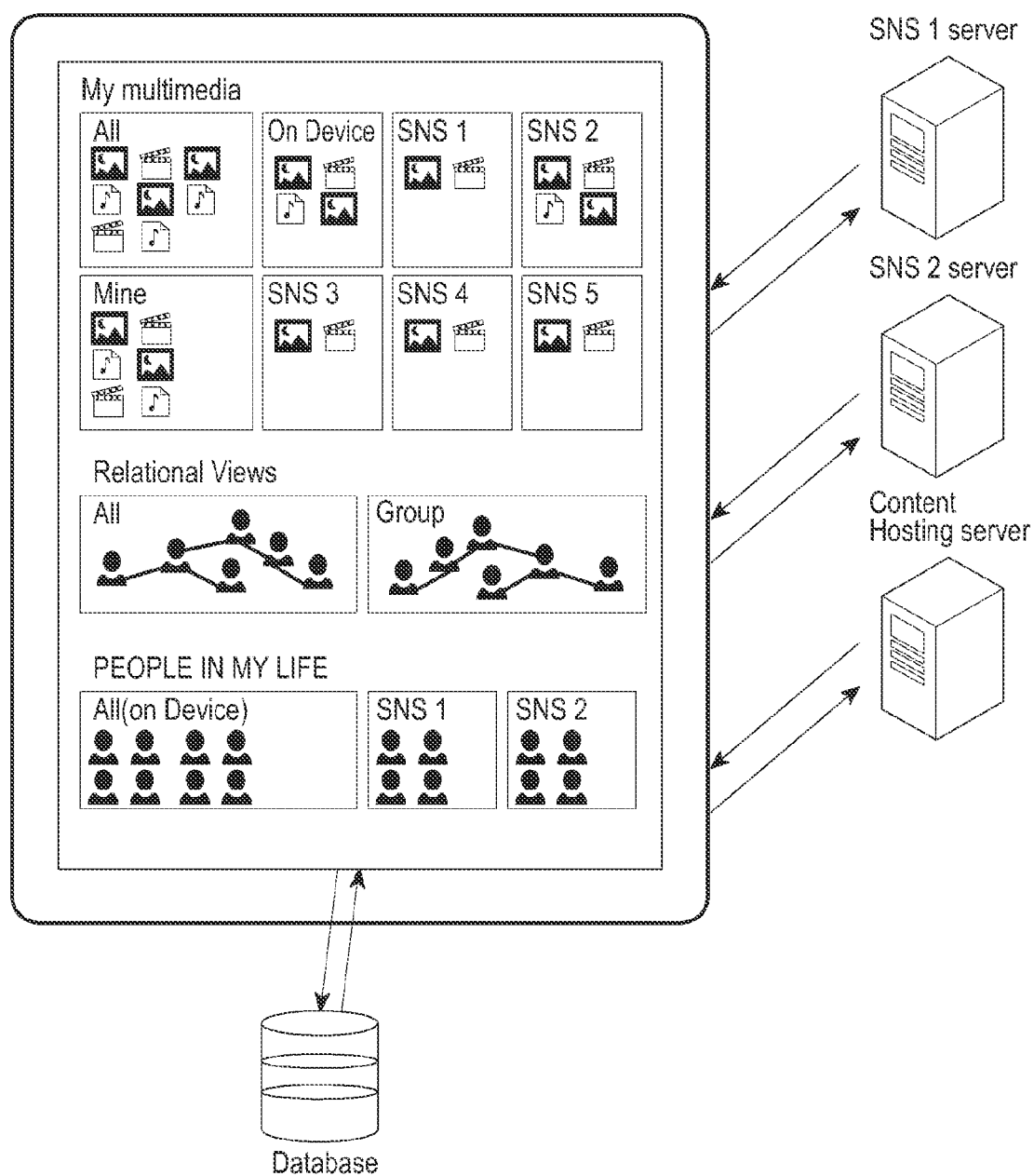
FIG. 1 illustrates a display screen showing items associated with different entities in a grid according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention include a method that provides a mechanism to manage items associated with different entities. According to exemplary embodiments of the present invention, the items can be content and contacts.

The method further provides sharing items between the different entities by performing one or more actions.

In an exemplary embodiment, content includes but not limited to multimedia content and communication content or the like.

According to exemplary embodiments of the present invention, the multimedia content can be audio, video, image, animations, text such as comments, messages, files, hypertext and link to content (e.g., hyperlinks) such as a Uniform Resource Locator (URL), and the like.

According to exemplary embodiments of the present invention, the communication content can be a Short Message Service (SMS), a Multimedia Messaging Service (MMS), calls, chats, emails, and the like.

Throughout the description the terms items, content, multimedia, media, contacts are used interchangeably.

According to exemplary embodiments of the present invention, the actions can be a voice, a gesture, a gaze, or the like.

According to exemplary embodiments of the present invention, the gesture can be a touch gesture such as a tap, a scroll, a swipe, a pinch, or the like, and a non-touch gesture such as a hover, an emotion, or the like.

According to exemplary embodiments of the present invention, the entity can be Social Networking Sites (SNS), relational views, content hosting servers, a device, and the like.

According to exemplary embodiments of the present invention, relational views comprise a group of contacts in the device, a group of contacts in the SNS, a group of contacts in the content hosting server, or the like. The group of contacts are formed from contacts in the device and SNS based on the common information between contacts associated with the entities.

According to exemplary embodiments of the present invention, a relational view may be created based on the common information between a user of the device and the contacts in the device and the contacts in a different SNS. Common information may include association with a same college, an interest, an office (e.g., a workplace), or the like. These relational views can be customized according to the user requirements.

According to exemplary embodiments of the present invention, the method allows the user to edit the relational view.

According to exemplary embodiments of the present invention, the editing may include adding or removing the contacts in the relational view.

According to exemplary embodiments of the present invention, as a non-exhaustive illustration only, the device can be a mobile device, a smart phone, a Personal Digital Assistant (PDA), a tablet, a laptop, a personal computer, a digital camera, a portable game console, an MP3 player, a Portable/Personal Multimedia Player (PMP), a handheld e-book, a High Definition Television (HDTV), or the like.

According to exemplary embodiments of the present invention, the gesture may be performed using one or more fingers, a stylus, or the like.

According exemplary embodiments of the present invention, the items may be shared by using voice input from the user. In this case, the device comprises a voice recognition module to recognize the input voice.

According to exemplary embodiments of the present invention, the items may be shared by performing a gaze action at the content.

According to exemplary embodiments of the present invention, the items may be shared by facial emotions. In this case, the device comprises an emotion recognition module to recognize the emotions.

Referring now to the drawings, and more particularly to FIGS. 1 through 15, in which similar reference characters denote corresponding features consistently throughout the figures, there are shown preferred exemplary embodiments of the present invention.

FIG. 1 illustrates a display screen showing items associated with different entities in a grid according to an exemplary embodiment of the present invention.

Referring to FIG. 1, the grid structure comprises content, contacts, and relational views. A database is updated with information received from various entities for future use. According to exemplary embodiments of the present invention, a device is connected to a network to receive information (e.g., live updates, feeds, and the like) associated with different entities.

FIG. 1 shows SNS 1 server, SNS 2 server and content hosting server for illustrative purpose.

According to exemplary embodiments of the present invention, a method presents a structure, but not restricted to a grid, linear or square layout but which could also be organic, non-linear grid structures having the capability to represent several entities within the structure and across similar grids. Further, the method may allow the user to move/shift one or more items (e.g., content, contacts, and the like) to organize and share the items for re-location, re-grouping and all interrelated actions relevant to such items.

Figure 2:
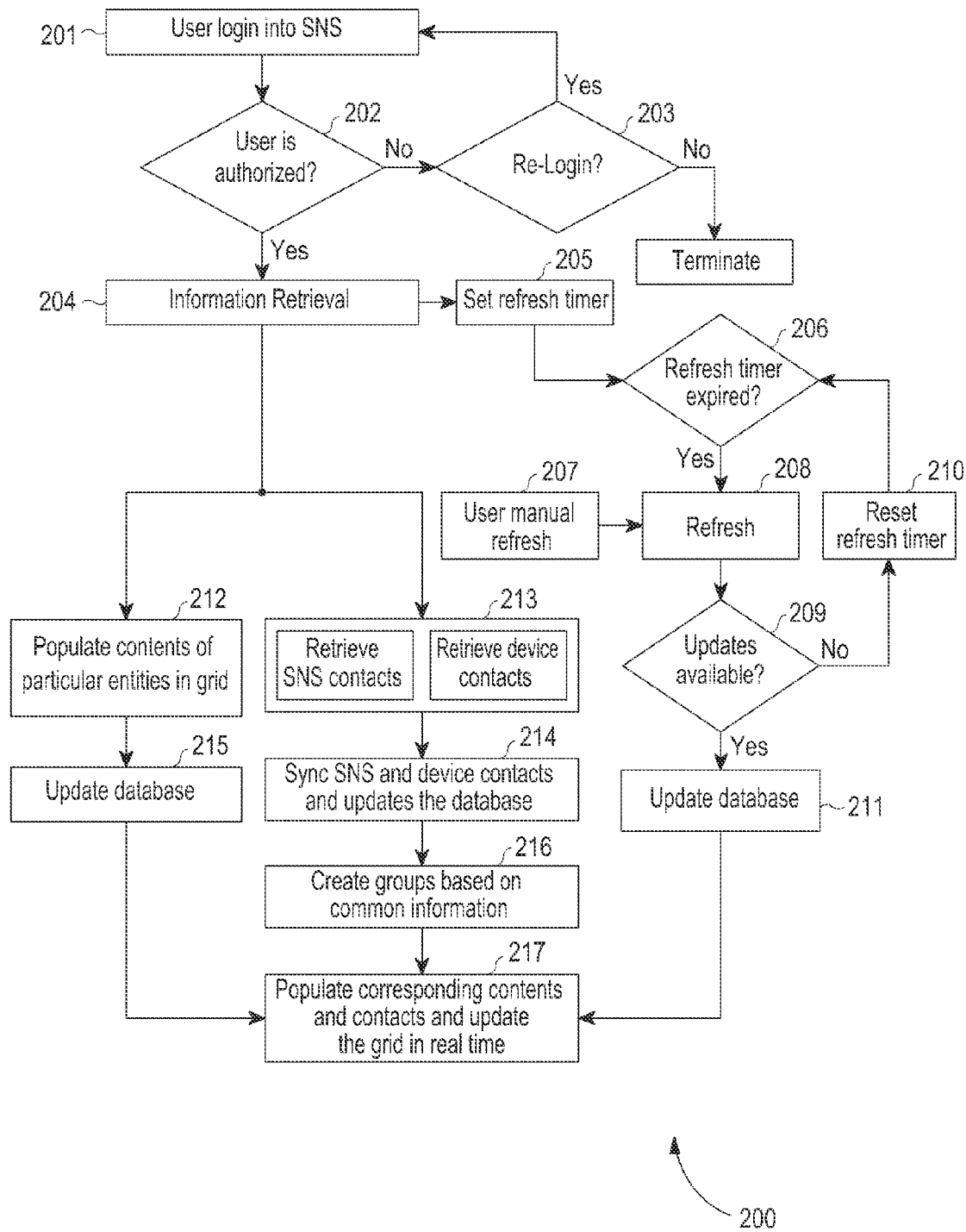
FIG. 2 illustrates a flow diagram explaining interactions for aggregating items associated with different entities according to an exemplary embodiment of the present invention.

FIG. 2 illustrates a flow diagram explaining interactions for aggregating items associated with different entities according to an exemplary embodiment of the present invention.

Referring to FIG. 2, as depicted in the flow diagram 200, the user logs into the SNS in step 201. Thereafter, the method determines whether the user is authorized. If the user is not authorized in step 202, then the method proceeds to step 203 in which the user has to re-login into the SNS. If the re-login results in failure, then the method terminates the login process of the user.

In contrast, if the user is authorized successfully in step 202, then the method proceeds to step 204 in which the method retrieves the items and information associated with the items for first time and/or item updates from the SNS. Further the method refreshes a timer to update new feed to the user in step 205. According to exemplary embodiments of the present invention, the timer is refreshed based on the time set by the user.

According to exemplary embodiments of the present invention, the user can configure the timer to update the item from SNS. For example, the user can set the timer to 5 minutes to receive the update.

According to exemplary embodiments of the present invention, the user can manually refresh the timer by performing one or more actions.

Further, the method determines whether the timer has expired.

According to exemplary embodiments of the present invention, the user sets manual refresh to receive items information from SNS in step 207.

Further, according to exemplary embodiments of the present invention, the method can refresh the timer anytime in step 208.

Further, according to exemplary embodiments of the present invention, the method allows the user to check for updates (e.g., items update) in step 209. If there is no update, then the method resets the timer in step 210. If an update is available in step 209, then the method proceeds to step 211 in which the method updates the database with information associated with items.

After the information is retrieved for a first time, the method populates content associated with particular entities in a grid displayed to the user in step 212. At the same time, the method retrieves contacts in SNS and also retrieves contacts in the device in step 213. Thereafter, the method performs a sync between SNS and device contacts, and updates the database in step 214.

Similarly, after populating the content of particular entities in step 212, the method updates the database in step 215.

Based on the contacts information, the method creates groups based on common information in step 216. Finally, the method populates corresponding content and contacts in associated entities and updates the grid in real time in step 217. The various actions in flow diagram 200 may be performed in the order presented, in a different order or simultaneously.

According to exemplary embodiments of the present invention, some actions listed in FIG. 2 may be omitted.

FIG. 3 illustrates database information according to an exemplary embodiment of the present invention.

Referring to FIG. 3, the database comprises different contacts, SNS associated therewith, and information collected from the SNS associated with the contacts. FIG. 3 shows the contacts associated with SNS 1, SNS 2 and SNS 3. The database shows the contact association with a particular SNS. For example contact A is associated with SNS 1 and SNS 3 and is not associated with SNS 2 and device. The database also has custom groups association of contacts. The database table shown in FIG. 3 is for illustrative purpose only and items information can be stored in any other different form.

Figure 4:
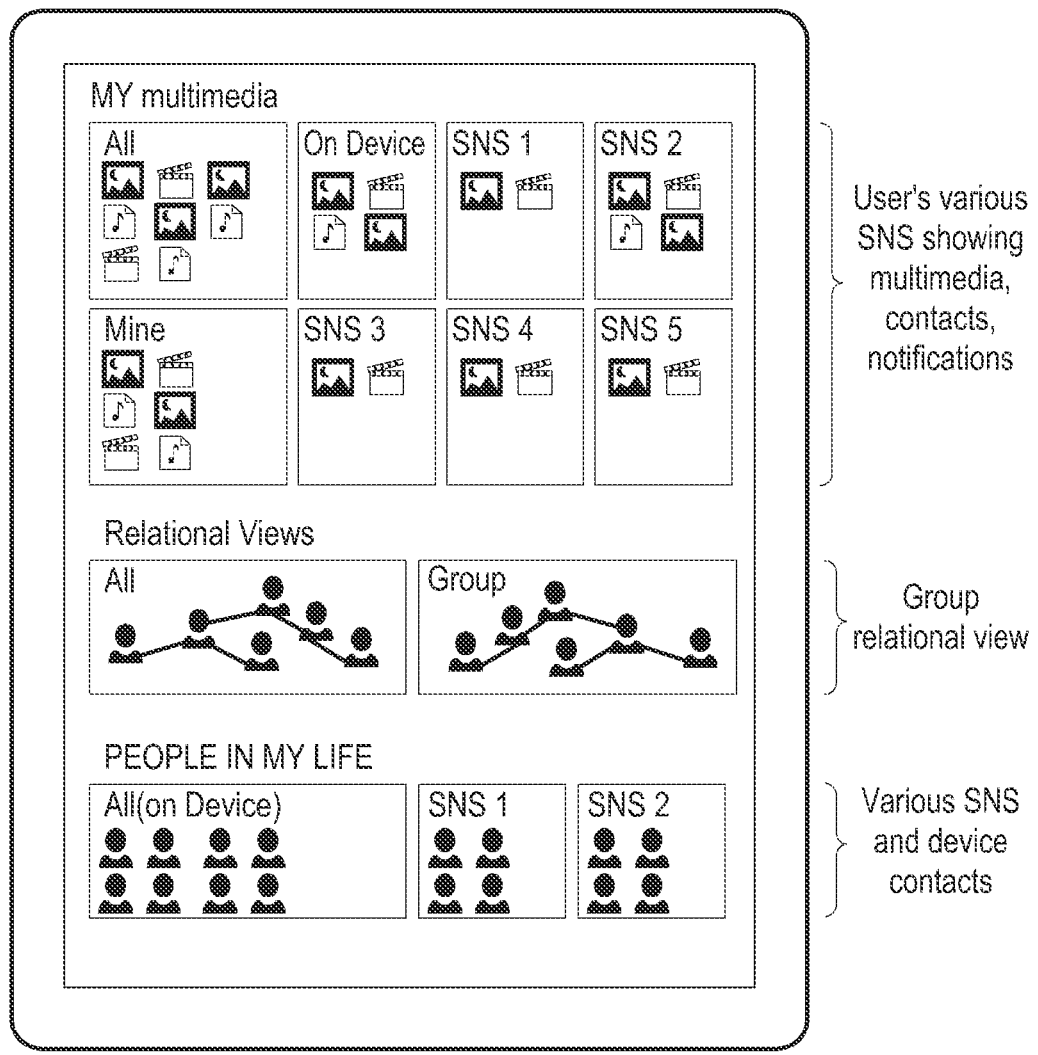
FIG. 4 illustrates a layered layout of a grid presented to a user with items displayed in respective entities according to an exemplary embodiment of the present invention.

FIG. 4 illustrates a layered layout of a grid presented to a user with items displayed in respective entities according to an exemplary embodiment of the present invention.

Referring to FIG. 4, a grid layout is presented to the user. The items associated with different entities are shown in the grid. The shared items may be shown as notification or alerts to the user.

Figure 5:
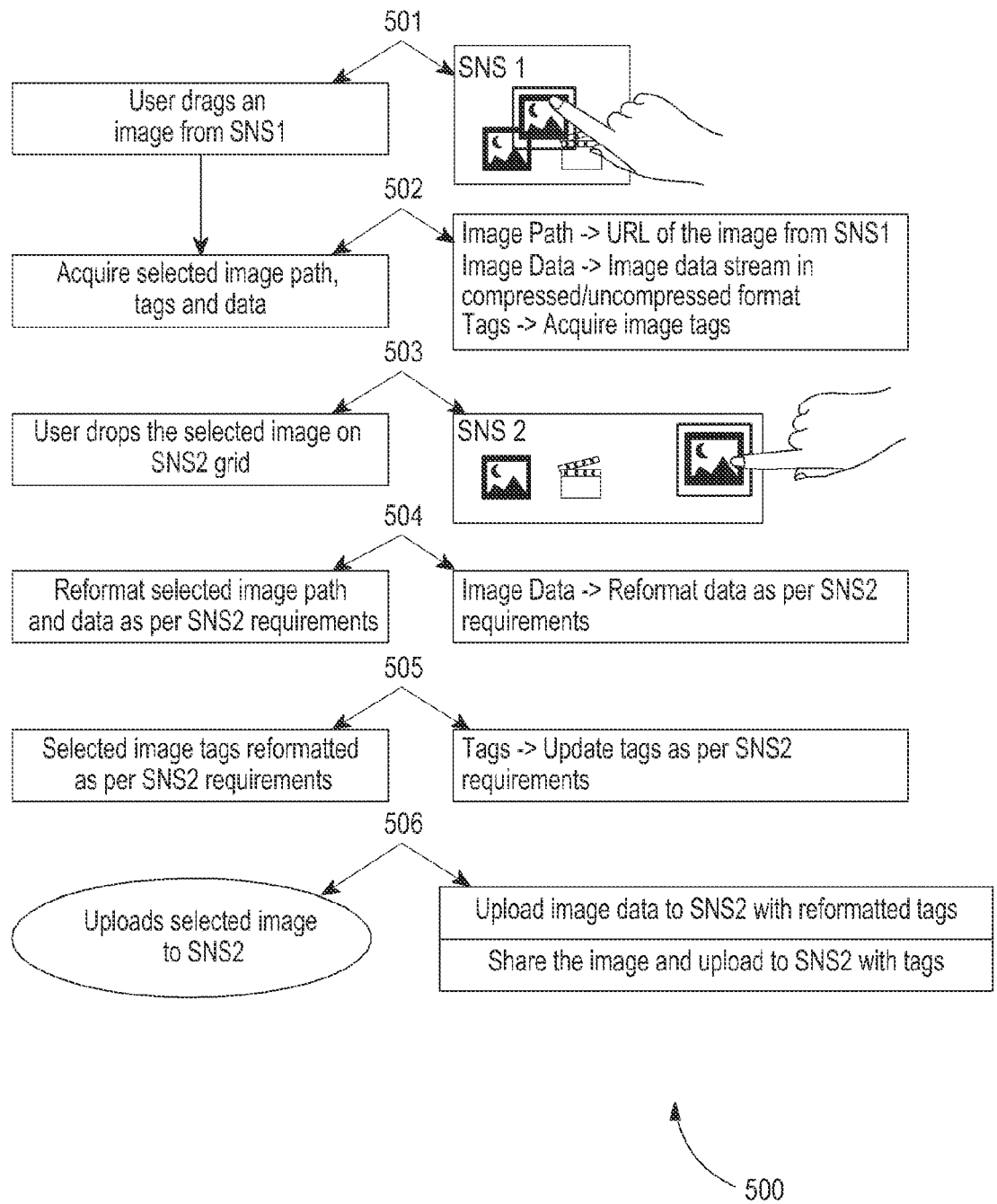
FIG. 5 illustrates a flow diagram explaining a process of cross content sharing between different entities based on one or more actions according to an exemplary embodiment of the present invention.

FIG. 5 illustrates a flow diagram explaining a process of cross content sharing between different entities based on one or more actions according to an exemplary embodiment of the present invention.

Referring to FIG. 5, as depicted in the flow diagram 500, initially the user drags an image in the entity SNS 1 in step 501.

Thereafter, the method acquires the image path, image data and tags associated with the image in step 502. According to exemplary embodiments of the present invention, the image path may be the Uniform Resource Locator (URL) of the image in SNS 1. Image data represents the image data stream either in compressed or uncompressed format. Tags represent the tagged details of the image in the SNS 1.

The user drops the selected image into SNS 2 grid in step 503.

Thereafter, the method reformats the selected image path and data as per SNS 2 requirements in step 504.

Further, the method reformats tags associated with the image as per SNS 2 requirements in step 505. According to exemplary embodiments of the present invention, the image data, image path and tags are reformatted based on SNS 2 requirements.

Finally, the method uploads the selected image to SNS 2 in step 506. The uploading step further comprises reformatting tags based on the format supported by the SNS 2.

By this method, the image in SNS 1 is shared to SNS 2. The user can instantly see the updated image in the SNS 2. The various actions in flow diagram 500 may be performed in the order presented, in a different order or simultaneously. Further, according to exemplary embodiments of the present invention, some actions listed in FIG. 5 may be omitted.

Figure 6:
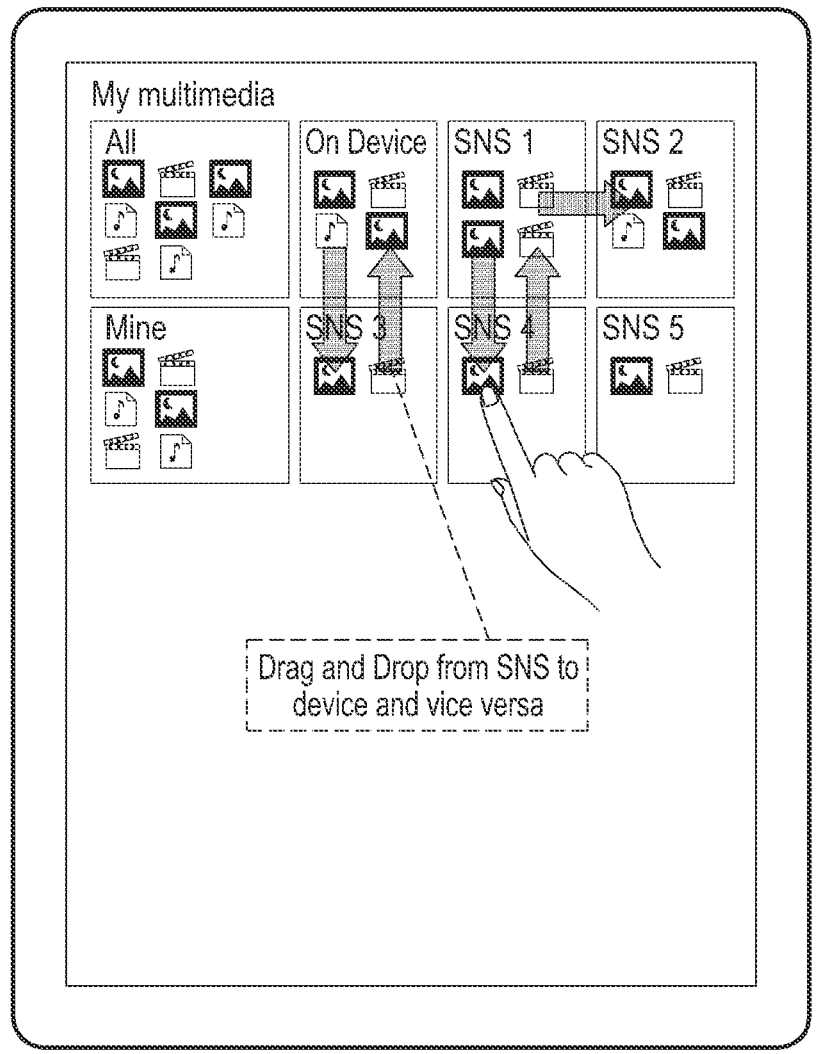
FIG. 6 illustrates an overview of sharing items between different entities based on one or more actions such as, for example, the sharing of content described in FIG. 5 according to an exemplary embodiment of the present invention.

FIG. 6 illustrates an overview of sharing items between different entities based on one or more actions such as, for example, the sharing of content described in FIG. 5 according to an exemplary embodiment of the present invention.

Referring to FIG. 6, a grid layout is provided in which the grid layout comprises multimedia content in the device, SNS 1, SNS 2, SNS 3, SNS 4 and SNS 5. The user performs a drag and drop gesture to share multimedia to SNS. For example, the audio in the device is dragged and dropped in the SNS 3 and a video in the SNS 3 is dragged and dropped into the device. Similarly, the user can share the content across different entities. According to exemplary embodiments of the present invention, content may be shared cross-platform.

Figure 7:
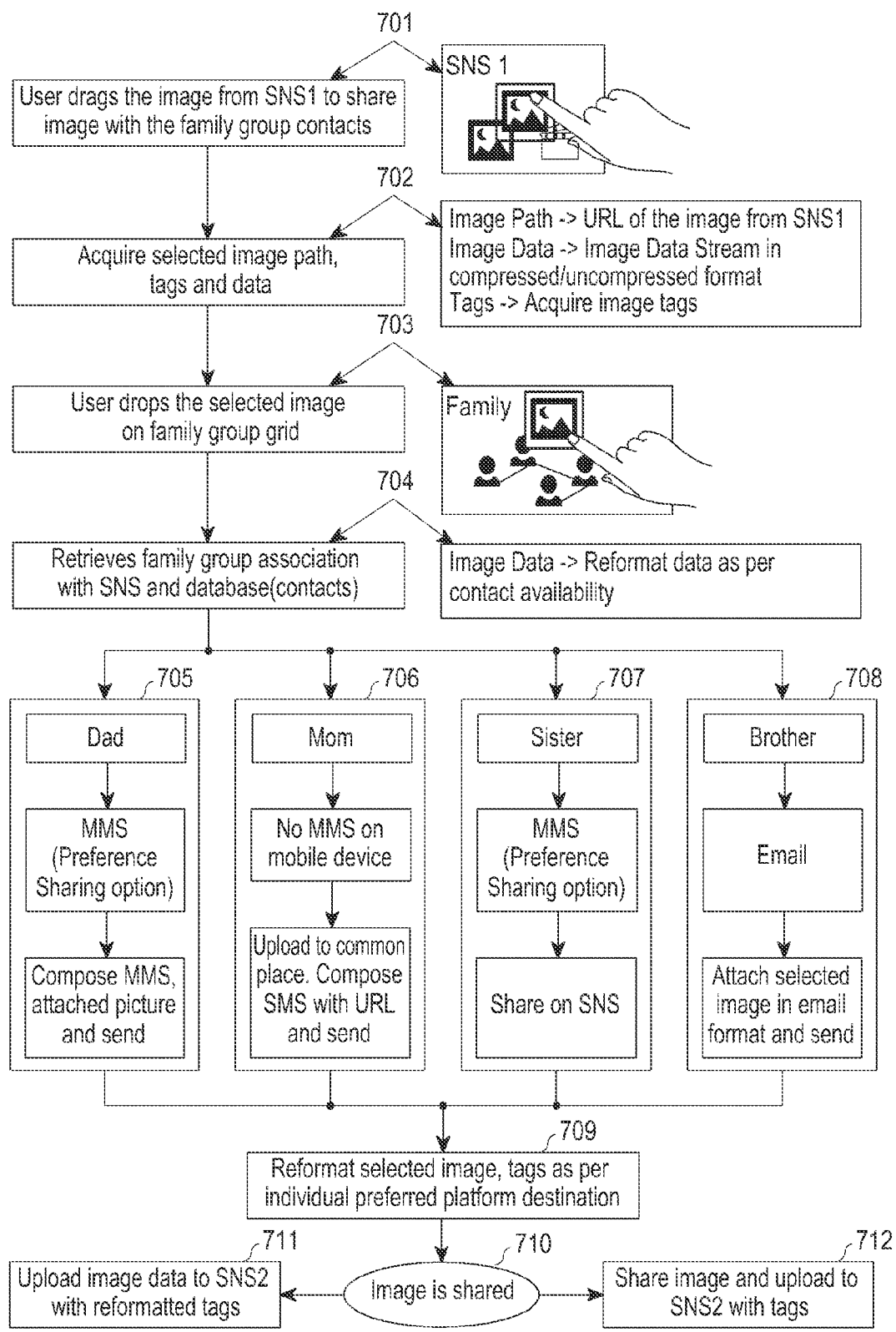
FIG. 7 illustrates a flow diagram explaining a process of sharing content associated with one entity to another different entity based on one or more actions according to an exemplary embodiment of the present invention.

FIG. 7 illustrates a flow diagram explaining a process of sharing content associated with one entity to another different entity based on one or more actions according to an exemplary embodiment of the present invention.

Referring to FIG. 7, as depicted in the flow diagram 700, initially the user drags an image from SNS 1 to share image with contacts in a family group in step 701.

Thereafter, the method further acquires the selected image path, tags, and image data in step 702.

Further the user drops the selected image on the family group grid in step 703.

Further, the method retrieves the contacts associated with family group amongst contacts associated in different entities in step 704.

According to exemplary embodiments of the present invention, a user or the user contacts are allowed to set preference of content sharing. As depicted in the FIG. 7, contacts such as a dad, a mom, a sister and a brother are in the family group of the user. The dad has been given a preference to share the media through Multimedia Messaging Service (MMS); the mom has been given a preference to share the media through a URL; the sister has been given preference to share the media through SNS; and the brother has been given the preference to share the media through email.

Based on the preference sharing option the device selects the best way to share the content to contacts in family group. Because the dad has the preference sharing option as MMS, the method composes an MMS and attaches the image and sends the image to the dad's device in step 705. The mom has the preference sharing option as a URL, because the MMS is not configured in the mom's device. Hence, the method uploads in step 706 the image to a common place and composes an SMS with a URL and sends to the mom's device. According to exemplary embodiments of the present invention, the common place can be different platforms or the device. The mom will get the notification in the form of a URL, by which mom knows that some image has been shared with her from the user. The sister has the preference sharing option as SNS. Accordingly, the method shares the image in the SNS and sister knows some image has been shared with her from the user in step 707. The brother has the preference sharing option as email and has given his email ID. Hence, the method shares the image as attachment in the email and send to the brother's email in step 708.

Thereafter, the method reformats the selected image, tags as per individual preferred platform destination in step 709.

Then the method shares the image with the contacts in family group in step 710.

According to exemplary embodiments of the present invention, the user of the device has set a common place sharing option as SNS 2, thus the method uploads the image to SNS 2 with reformatted tags in step 711.

The method shares the image and uploads in SNS 2 with tags in step 712. Further, the user can decide on sharing options to individual contacts in relational views.

The various actions in flow diagram 700 may be performed in the order presented, in a different order or simultaneously. Further, according to exemplary embodiments of the present invention, some actions listed in FIG. 7 may be omitted.

Figure 8:
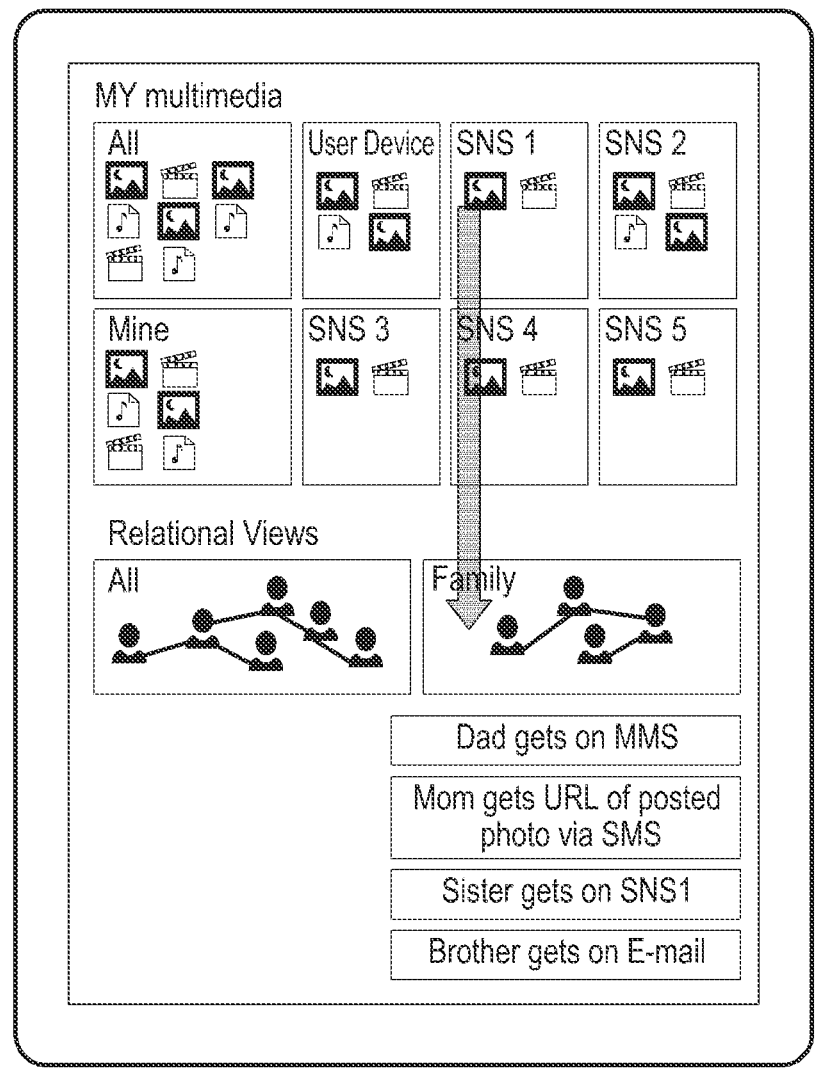
FIG. 8 illustrates an overview of sharing content between different entities based on one or more actions such as, for example, the sharing of content described in FIG. 7 according to an exemplary embodiment of the present invention.

FIG. 8 illustrates an overview of sharing content between different entities based on one or more actions such as, for example, the sharing of content described in FIG. 7 according to an exemplary embodiment of the present invention.

Referring to FIG. 8, the user of the device intends to share multimedia content with his/her family group contacts simultaneously. As shown in the figure, the user drags the image from SNS 1 and drops the selected image in the family group. The method shares the dropped content to the contacts in family group. The sharing could be based on the preference set by the contacts. In that case, the image content is shared with the dad through the MMS; image content is shared with the mom through a URL and sends this URL through SMS. Similarly, the image is shared with the sister in SNS 1, and shared with the brother as an attachment to the brother's email ID.

Figure 9:
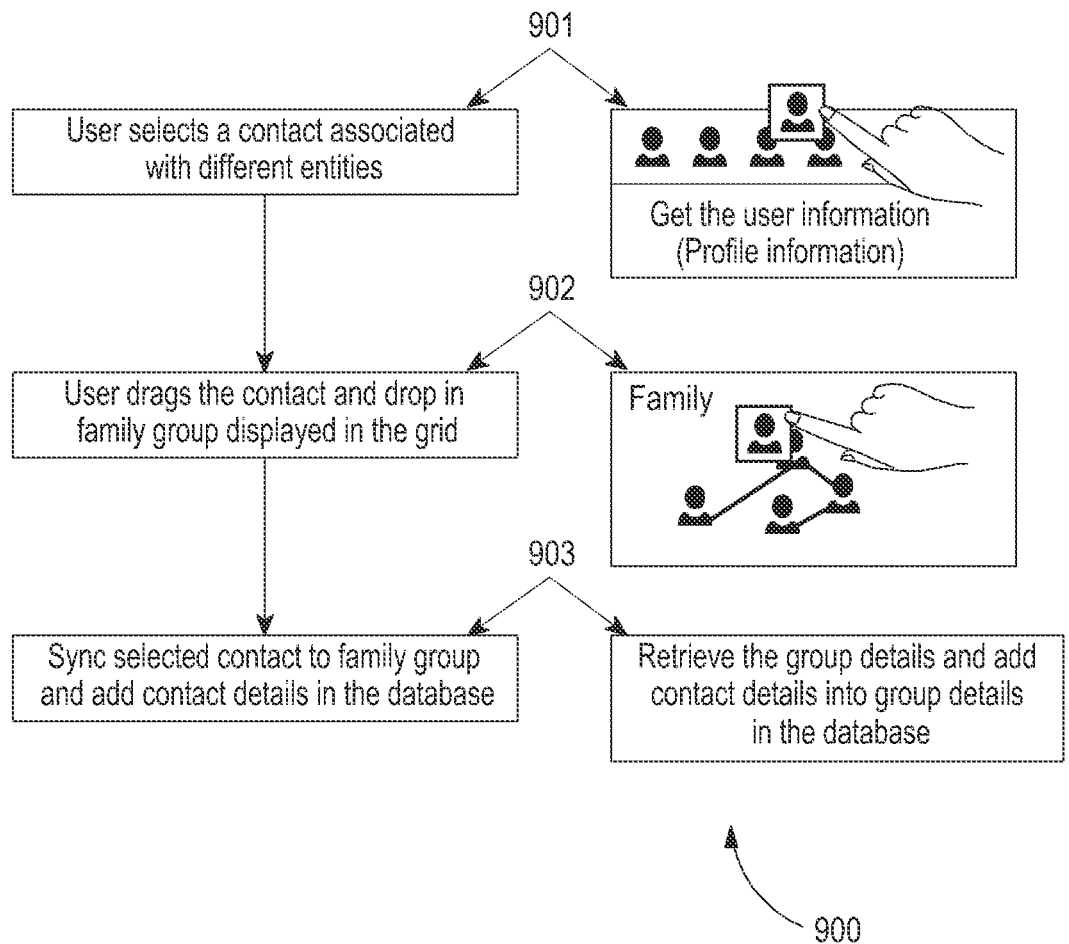
FIG. 9 illustrates a flow diagram explaining a process of adding a new contact to an entity based on one or more actions according to an exemplary embodiment of the present invention.

FIG. 9 illustrates a flow diagram explaining a process of adding a new contact to an entity based on one or more actions according to an exemplary embodiment of the present invention.

Referring to FIG. 9, as depicted in the flow diagram 900, the user wishes to add one or more contacts to the family group. In this case, the user selects one or more contacts associated with different entities in step 901. In this case user drags the selected contact to the family group and drops the selected family contact on the family group in step 902. Further, the method synchronizes (e.g., syncs) the contact to the family group and updates the family group in the database in step 903.

According to exemplary embodiments of the present invention, the user may be enabled to add/delete any contact associated with the different entities to any relational view. The various actions in flow diagram 900 may be performed in the order presented, in a different order or simultaneously. Further, according to exemplary embodiments of the present invention, some actions listed in FIG. 9 may be omitted.

Figure 10:
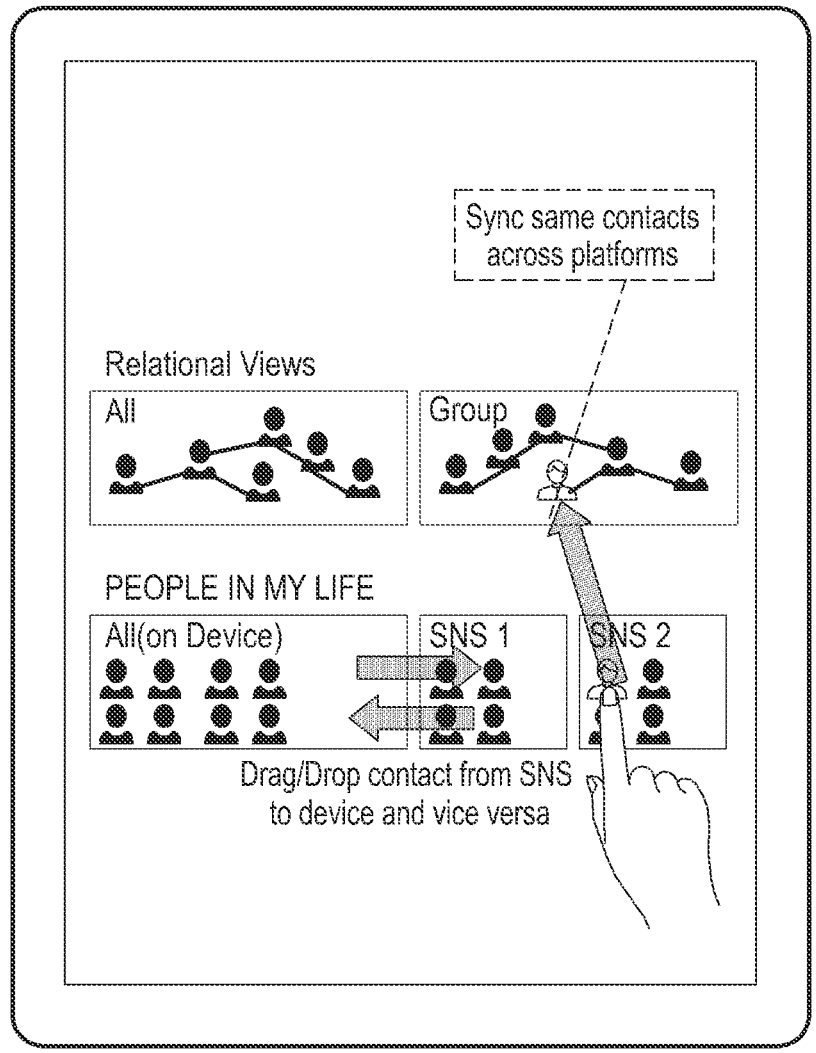
FIG. 10 illustrates an overview of editing a group and synchronizing contacts between different entities based on one or more actions, according to an exemplary embodiment of the present invention.

FIG. 10 illustrates an overview of editing a group and synchronizing contacts between different entities based on one or more actions according to an exemplary embodiment of the present invention.

Referring to FIG. 10, the user of the device wishes to add a new contact from SNS to the group. In this case, the user selects the contact associated with SNS 2 using a gesture and adds the selected contact to the group. For example, the user finds his/her relation in the SNS 2 and then the user wishes to add the relation to his/her family group in the device. According to exemplary embodiments of the present invention, the user can drag and drop contacts between SNS 1, SNS 2, and vice versa. In this case, the method synchronizes the selected contact between these SNS.

Figure 11:
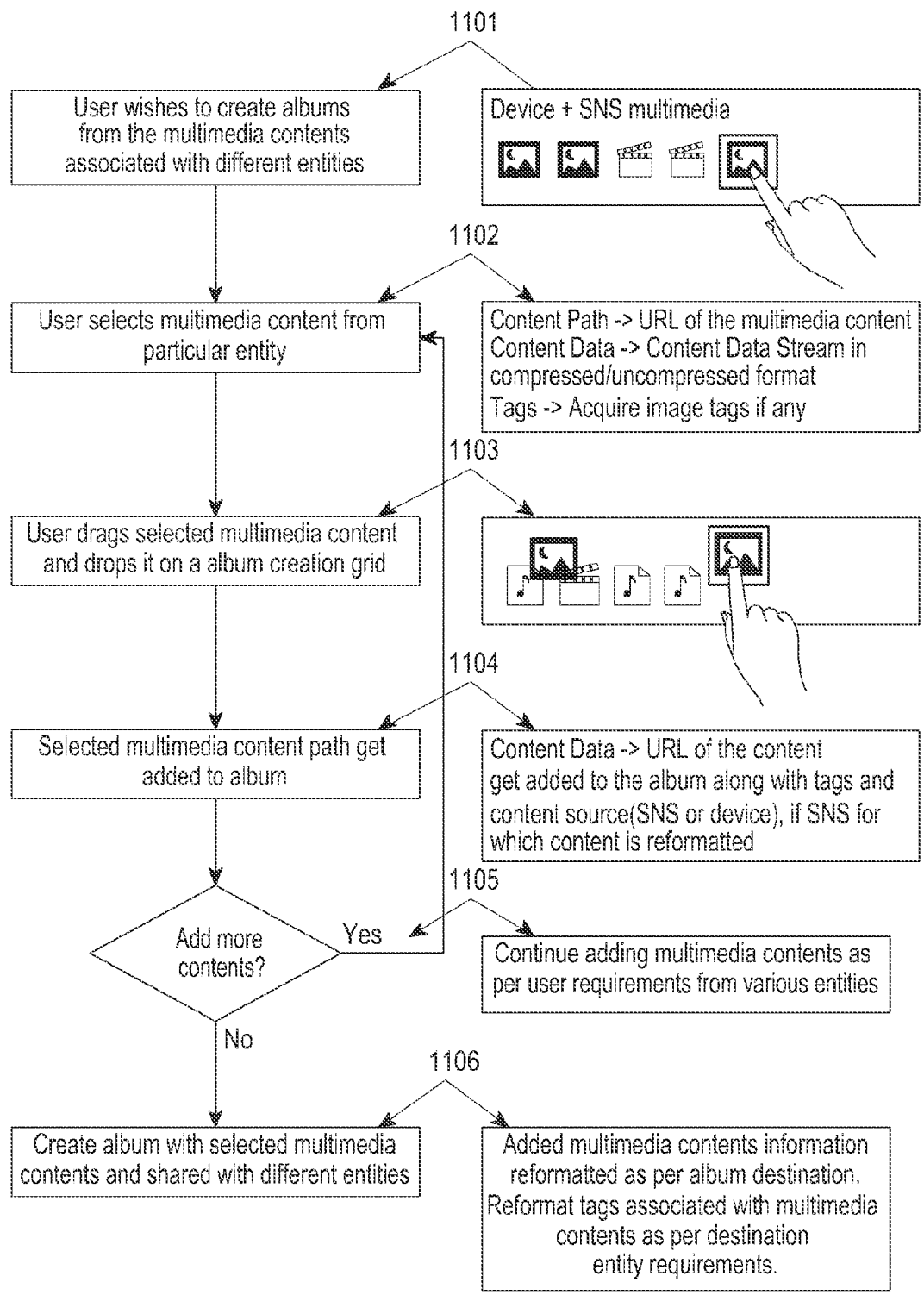
FIG. 11 illustrates a flow diagram explaining a process of creating an album from multimedia content associated with different entities based on one or more actions according to an exemplary embodiment of the present invention.

FIG. 11 illustrates a flow diagram explaining a process of creating an album from multimedia content associated with different entities based on one or more actions according to an exemplary embodiment of the present invention.

Referring to FIG. 11, as depicted in the flow diagram 1100, the user of the device wishes to create albums from the multimedia content associated with different entities in step 1101. For example, the user may provide an input associated with the user's desire to create an album from the multimedia content.

Thereafter, the user selects a particular multimedia content from a particular entity in step 1102. Further, the method acquires the selected content data, selected content path, and tags associated with the selected content.

Further, the user drags the selected content and drops the selected content on an album creation grid in step 1103.

Thereafter, the method adds the selected content path to the created album in step 1104. For example, the content data can be a URL of the content that gets added to the album content along with tags and content source (e.g., SNS, device, or the like). If the content source is SNS, then the content is reformatted with the format supported by the SNS.

The method allows the user to add more multimedia content into the album in step 1105. For example, the user may continuously add multimedia from various entities.

If the method determines that the user does not want to add more multimedia content in step 1105, then the method allows the user to create album with selected multimedia content and share with different entities in step 1106. Finally the method reformats the added multimedia content information as per album destination entity. Also, the tags associated with the multimedia content are reformatted as per destination entity requirements.

According to exemplary embodiments of the present invention, various actions in flow diagram 1100 may be performed in the order presented, in a different order or simultaneously. Further, according to exemplary embodiments of the present invention, some actions listed in FIG. 11 may be omitted.

According to exemplary embodiments of the present invention, the user is enabled to create an album instantly using content associated with different entities.

According to exemplary embodiments of the present invention, the user may edit the album.

According to exemplary embodiments of the present invention, the editing may be adding or removing the content in the album.

Figure 12:
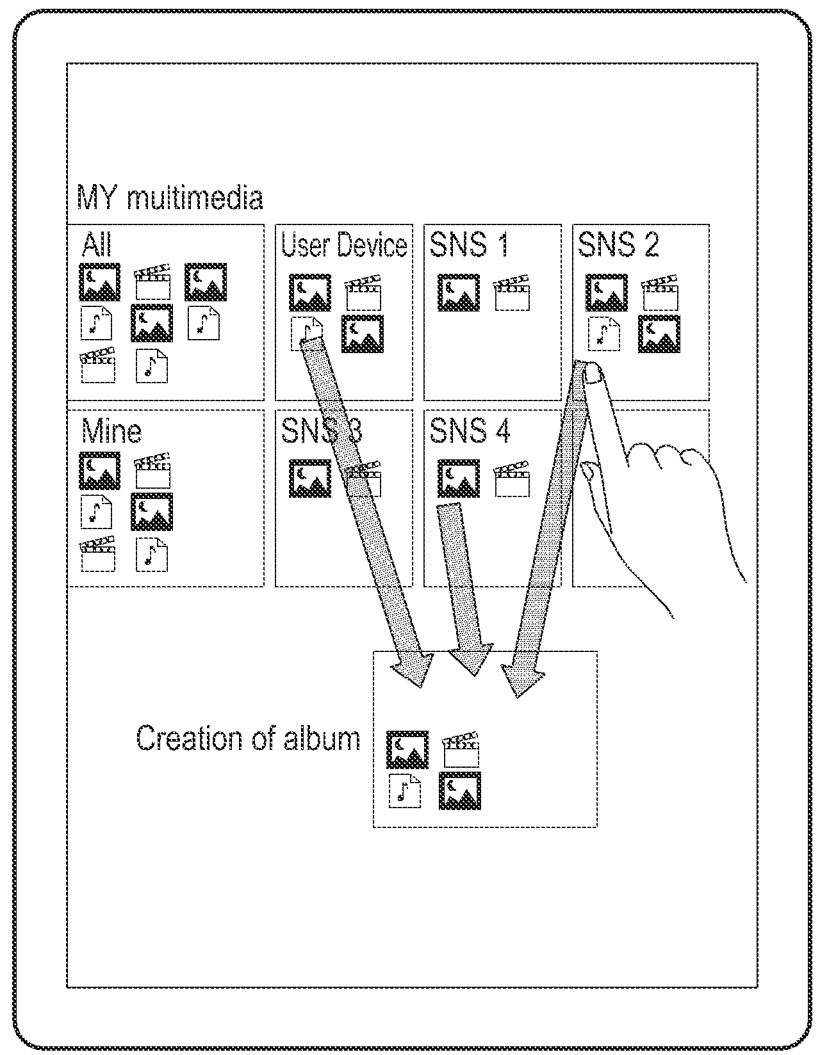
FIG. 12 illustrates an overview of creating an album based on one or more actions such as, for example, the creating of the album described in FIG. 11 according to an exemplary embodiment of the present invention.

FIG. 12 illustrates an overview of creating an album based on one or more actions such as, for example, the creating of the album described in FIG. 11 according to an exemplary embodiment of the present invention.

Referring to FIG. 12, the user wishes to create the album with multiple multimedia content associated with different entities. For example, user selects and drags audio in device, audio in SNS 2, image in SNS 4 to create the album.

According to exemplary embodiments of the present invention, the created album can be shared among the group contacts associated with different entities.

Figure 13:
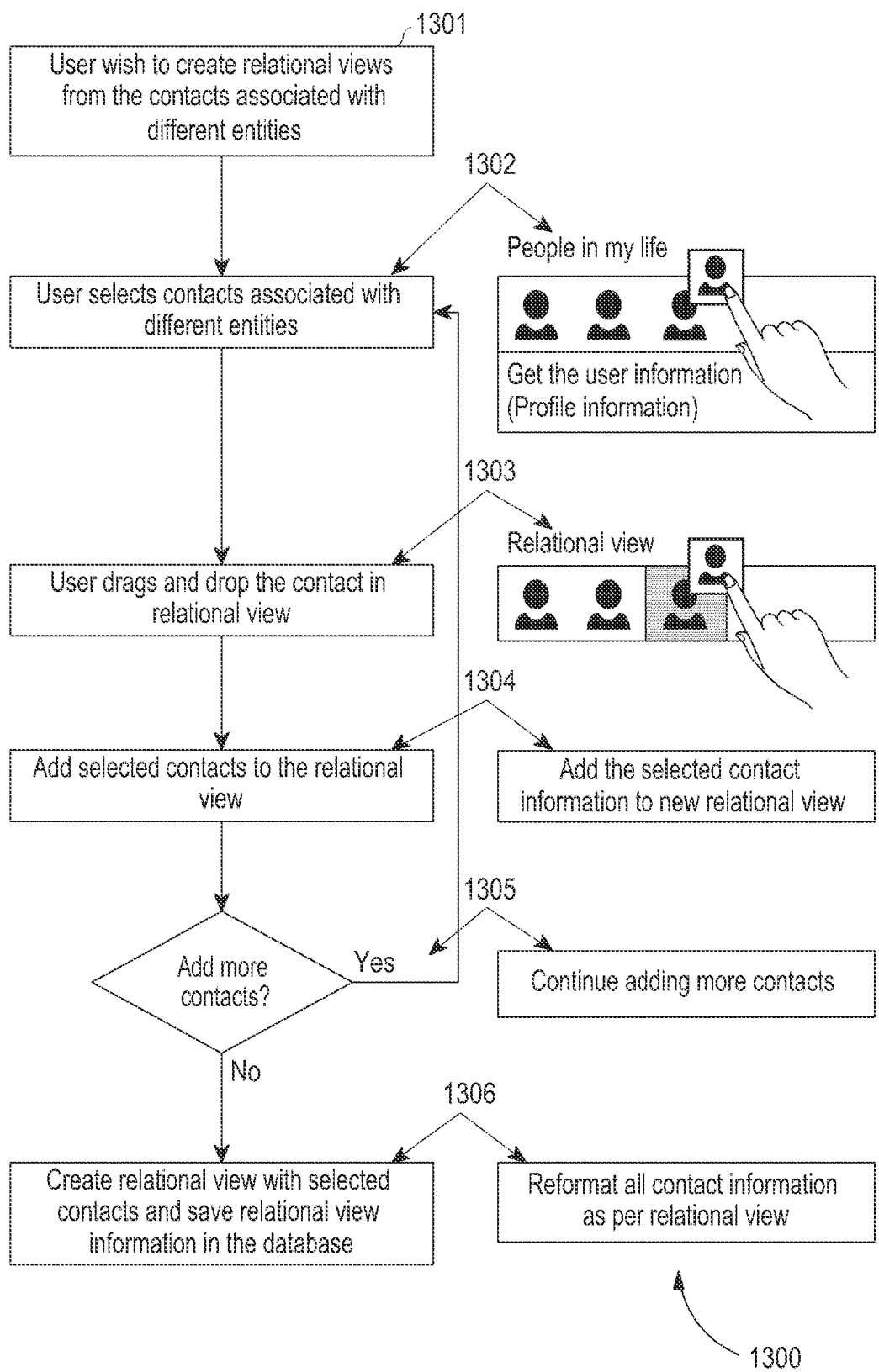
FIG. 13 illustrates a flow diagram explaining a process of creating relational views from contacts associated with different entities based on one or more actions according to an exemplary embodiment of the present invention.

FIG. 13 illustrates a flow diagram explaining a process of creating relational views from contacts associated with different entities based on one or more actions according to an exemplary embodiment of the present invention.

Referring to FIG. 13, as depicted in the flow diagram 1300, the user wishes to create relational views from the contacts associated with different entities in step 1301. For example, the user may provide an input associated with the user's desire to create relational views from the contacts associated with different entities.

Thereafter, the user selects the contacts associated with different entities to create relational view in step 1302.

The user drags contacts from different entities and drops them into relational view in step 1303.

The method adds selected contacts into the created relational view in step 1304. Further the device updates the database with the new relational view information.

Further the method allows the user to add more contacts to the created relational view in step 1305. For example, the method may request the user to provide an indication as to whether the user wishes to add more contacts to the created relational view.

If the method determines that the user does not want to add more contacts in step 1305, then the method proceeds to step 1306 in which the method allows the user to create the relational view with selected contacts and save the relational view information in the database. Further the device reformats the contact information as per the relational view.

The various actions in flow diagram 1300 may be performed in the order presented, in a different order or simultaneously. Further, according to exemplary embodiments of the present invention, some actions listed in FIG. 13 may be omitted.

Figure 14:
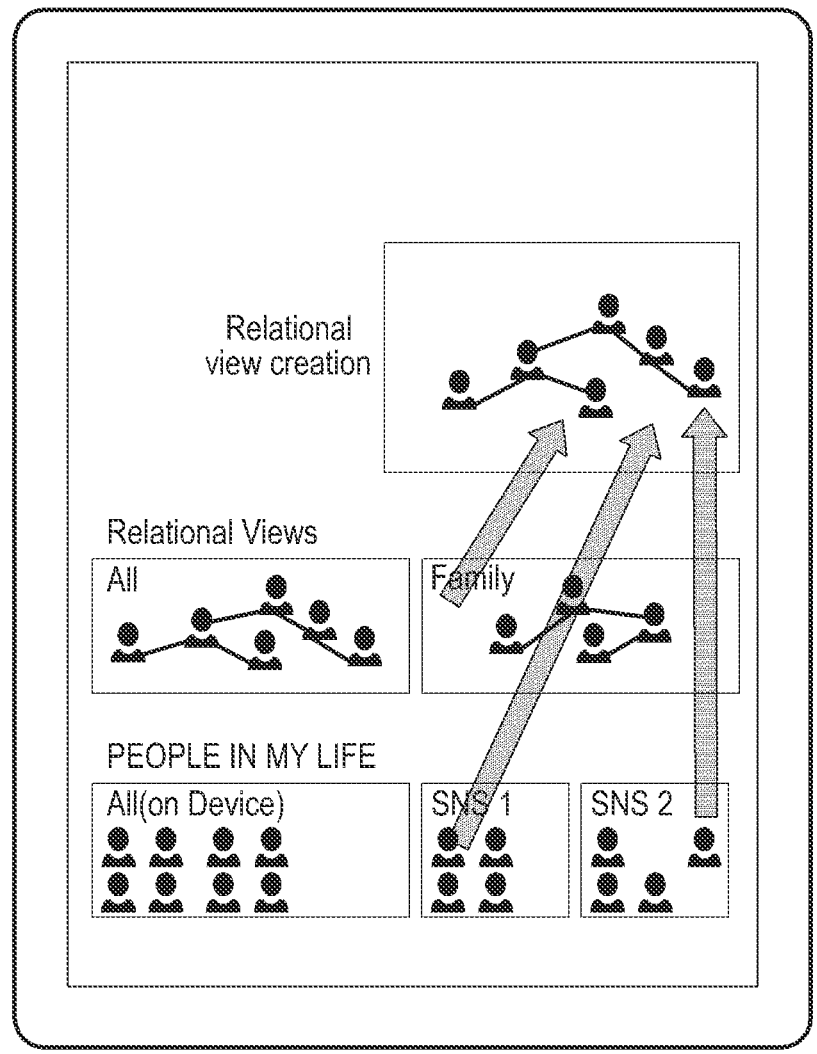
FIG. 14 illustrates an overview of relational view creation by performing one or more actions such as, for example, the creating of relational views described in FIG. 13 according to an exemplary embodiment of the present invention.

FIG. 14 illustrates an overview of relational view creation by performing one or more actions such as, for example, the creating of relational views described in FIG. 13 according to an exemplary embodiment of the present invention.

Referring to FIG. 14, the user of the device wants to create the relational view from the contacts associated with SNS 1 and SNS 2 and existing family group in the device. Further the user drags the contacts and drops the selected contacts into the created relational view. Further the device updates selected contacts in the created relational view and updates the database. For example, the user selects one or more contacts from SNS 1, SNS 2 and then creates new relational view as sports and adds the selected contacts into the sports. For example, if the user has a friend in SNS 1 who expressed interest in football in SNS 1 and another contact in the SNS 2 with similar interest expressed, then these 2 friends are made part of relational view "interested in football".

Figure 15:
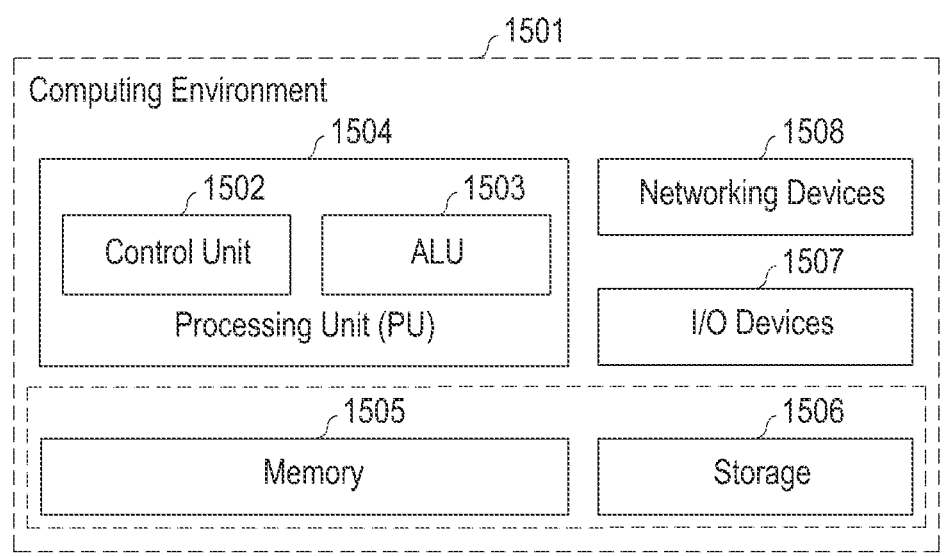
FIG. 15 illustrates a computing environment implementing a content sharing method across cross platforms according to an exemplary embodiment of the present invention.

FIG. 15 illustrates a computing environment implementing a content sharing method across cross platforms according to an exemplary embodiment of the present invention.

Referring to FIG. 15, the computing environment 1501 comprises at least one processing unit 1504, a memory 1505, a storage unit 1506, at least one networking device 1508 and at least one Input Output (I/O) device 1507.

The at least one processing unit may be equipped with a control unit 1502 and an Arithmetic Logic Unit (ALU) 1503. The processing unit 1504 is responsible for processing the instructions of the algorithm. The processing unit 1504 receives commands from the control unit in order to perform its processing. Further, any logical and arithmetic operations involved in the execution of the instructions are computed with the help of the ALU 1503.

The overall computing environment 1501 may be composed of multiple homogeneous and/or heterogeneous cores, multiple CPUs of different kinds, special media and other accelerators. The processing unit 1504 is responsible for processing the instructions of the algorithm. Further, the processing unit 1504 may be located on a single chip or over multiple chips.

The algorithm comprising of instructions and codes required for the implementation are stored in either the memory unit 1505 or the storage 1506 or both. At the time of execution, the instructions may be fetched from the corresponding memory 1505 and/or storage 1506, and executed by the processing unit 1504.

In case of any hardware implementations various networking devices 1508 or external I/O devices 1507 may be connected to the computing environment to support the implementation through the networking unit and the I/O device unit.

Exemplary embodiments of the present invention can be implemented through at least one software program running on at least one hardware device and performing network management functions to control the elements. The elements shown in FIG. 15 include blocks which can be at least one of a hardware device, or a combination of hardware device and software module. For example, the memory 1505 and/or storage 1506 may respectively include a non-transient computer-readable storage medium.

It will be appreciated that embodiments of the present invention according to the claims and description in the specification can be realized in the form of hardware, software or a combination of hardware and software.

Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing at least one item associated with a plurality of entities, the method comprising:
    displaying the at least one item associated with at least one entity of the plurality of entities;
    receiving a selection of at least one item corresponding to a first entity of the plurality of entities; and
    in response to at least one action to share the selected at least one item with a second entity of the plurality of entities, uploading the selected at least one item to a server corresponding to the second entity.

2. The method as in claim 1, wherein the at least one item comprises at least one of content and contacts.

3. The method as in claim 1, wherein the at least one entity of the plurality of entities comprises at least one of Social Networking Sites (SNS), a relational view, a content hosting server, and a device.

4. The method as in claim 1, wherein the at least one action comprises at least one of a gesture, a voice, and a gaze, and
    wherein the gesture comprises an emotion, a tap, a scroll, a drag, a drop, a pinch, a swipe and a hover.

5. The method as in claim 1, further comprising:
    sharing at least one content with at least one contact associated with at least one relational view.

6. The method as in claim 1, further comprising:
    storing a preference of at least one contact to share at least one content; and
    sharing the at least one content with the at least one contact associated with at least one relational view based on the stored preference.

7. The method as in claim 1, further comprising:
    creating at least one album using content associated with the at least one entity of the plurality of entities; and
    editing the at least one album,
    wherein the editing comprises at least one of adding and removing the content in the at least one album.

8. The method as in claim 1, further comprising:
    reformatting at least one shared content based on a format supported by the at least one entity of the plurality of entities.

9. The method as in claim 1, further comprising:
    acquiring information associated with at least one shared content before sharing the at least one shared content with the at least one entity of the plurality of entities.

10. A system for managing at least one item associated with a plurality of entities, wherein the system comprises a device, and
    wherein the system is configured to:
        display the at least one item associated with at least one entity of the plurality of entities,
        receive selection of at least one item corresponding to a first entity of the plurality of entities, and
        in response to at least one action to share the selected at least one item with a second entity of the plurality of entities, upload the selected at least one item to a server corresponding to the second entity.

11. An electronic device for managing at least one item associated with a plurality of entities, the electronic device comprising:
    an integrated circuit further comprising at least one processor; and
    at least one memory comprising a computer program code stored thereon;
    wherein when the computer program code is executed, the at least one processor causes the electronic device to:
        display the at least one item associated with at least one entity of the plurality of entities,
        receive selection of at least one item corresponding to a first entity of the plurality of entities, and
        in response to at least one action to share the at selected least one item with a second entity of the plurality of entities, upload the selected at least one item to a server corresponding to the second entity.

12. The electronic device as in claim 11, wherein the at least one item comprises at least one of content and contacts.

13. The electronic device as in claim 11, wherein the at least one entity of the plurality of entities comprises at least one of Social Networking Sites (SNS), a relational view, a content hosting server, and a device.

14. The electronic device as in claim 11, wherein the at least one action comprises at least one of a gesture, a voice, and a gaze, and
wherein the gesture comprises an emotion, a tap, a scroll, a drag, a drop, a pinch, a swipe and a hover.

15. The electronic device as in claim 11, wherein the electronic device is further configured to share the at least one content with the at least one contact associated with at least one the relational view.

16. The electronic device as in claim 11, wherein the electronic device is further configured to:
store a preference of at least one contact to share at least one content; and
share the at least one content with the at least one contact associated with at least one relational view based on the stored preference.

17. The electronic device as in claim 11, wherein the electronic device is further configured to create at least one album using content associated with the at least one entity of the plurality of entities, and to edit the at least one album for performing at least one of adding and removing the content in the at least one album.

18. The electronic device as in claim 11, wherein the electronic device is further configured to reformat at least one shared content based on a format supported by the at least one entity of the plurality of entities.

19. The electronic device as in claim 11, wherein the electronic device is further configured to acquire information associated with at least one shared content before sharing the at least one shared content with the at least one entity of the plurality of entities.

20. A non-transitory computer-readable storage medium storing instructions that, when executed, cause at least one processor to perform the method of claim 1.

* * * * *